(12) United States Patent
Ekici et al.

(10) Patent No.: US 9,280,245 B2
(45) Date of Patent: Mar. 8, 2016

(54) TOUCH PANEL SENSOR HAVING DUAL-MODE CAPACITIVE SENSING FOR DETECTING AN OBJECT

(71) Applicant: Qualcomm Technologies, Inc., San Diego, CA (US)

(72) Inventors: Ali Ekici, Los Gatos, CA (US); Ozan Erdogan, Saratoga, CA (US); Stephen C. Gerber, Austin, TX (US); Syed F. Ahmad, San Jose, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 66 days.

(21) Appl. No.: 14/182,838

(22) Filed: Feb. 18, 2014

(65) Prior Publication Data

US 2014/0240280 A1    Aug. 28, 2014

Related U.S. Application Data

(60) Provisional application No. 61/770,611, filed on Feb. 28, 2013.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04104* (2013.01)

(58) Field of Classification Search
CPC . G06F 3/03545; G06F 3/03546; G06F 3/041; G06F 3/0412; G06F 3/0416; G06F 3/044; G06F 3/0488–3/04886; G06F 2203/04101; G06F 2203/04104; G06F 2203/04106; G06F 2203/04108; G06F 2203/04111; G06F 2203/04112
See application file for complete search history.

(56) References Cited

U.S. PATENT DOCUMENTS

| | | | |
|---|---|---|---|
| 8,319,505 B1 | 11/2012 | Maharyta | |
| 8,358,142 B2 | 1/2013 | Maharyta | |
| 2010/0060593 A1* | 3/2010 | Krah | 345/173 |
| 2012/0154324 A1* | 6/2012 | Wright et al. | 345/174 |
| 2014/0145997 A1* | 5/2014 | Tiruvuru | G06F 3/0416 345/174 |

* cited by examiner

*Primary Examiner* — Nathan Danielsen
(74) *Attorney, Agent, or Firm* — Weaver Austin Villeneuve & Sampson, LLP

(57) ABSTRACT

An apparatus configured to determine an approximate position of an object utilizing mutual-capacitance sensing capabilities during a first mode of operation and determining one or more attributes of the object utilizing self-capacitance sensing capabilities during a second mode of operation is disclosed. The apparatus includes a touch panel controller configured to operatively couple to a touch panel sensor. The touch panel sensor includes a plurality of drive electrodes and at least one sense electrode. A plurality of nodes are formed at the intersections of the plurality of drive electrodes and the at least one sense electrode. The touch panel controller is configured to determine an approximate position of an object performing a touch event over the touch panel sensor during the first mode of operation and to determine one or more attributes of the object during the second mode of operation.

20 Claims, 4 Drawing Sheets

TOUCH PANEL SENSOR HAVING DUAL-MODE CAPACITIVE SENSING FOR DETECTING AN OBJECT

PRIORITY CLAIM

This application claims priority to U.S. Provisional patent application No. 61/770,611, filed on Feb. 28, 2013 and entitled "TOUCH PANEL SENSOR HAVING DUAL-MODE CAPACITIVE SENSING FOR DETECTING AN OBJECT," which is hereby incorporated by reference.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, media devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

An apparatus configured to determine an approximate position of an object utilizing mutual-capacitance sensing capabilities during a first mode of operation and determining one or more attributes of the object utilizing self-capacitance sensing capabilities during a second mode of operation is disclosed. In one or more implementations, the apparatus includes a touch panel controller configured to operatively couple to a touch panel sensor. The touch panel sensor includes a plurality of drive electrodes and at least one sense electrode. A plurality of nodes are formed at the intersections of the plurality of drive electrodes and the at least one sense electrode. The touch panel controller includes output circuitry operatively coupled to the plurality of drive electrodes. The output circuitry is configured to generate drive signals to drive the touch panel sensor. The touch panel controller also includes input circuitry operatively coupled to the at least one sense electrode. The input circuitry is configured to measure mutual-capacitance formed at each intersection of the plurality of drive electrodes and of the at least one sense electrode during a first mode of operation and to measure self-capacitance of the at least one sense (or drive) electrode during a second mode of operation. The touch panel controller is configured to determine an approximate position of an object performing a touch event over the touch panel sensor during the first mode of operation and to determine one or more attributes of the object during the second mode of operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Figure 1:
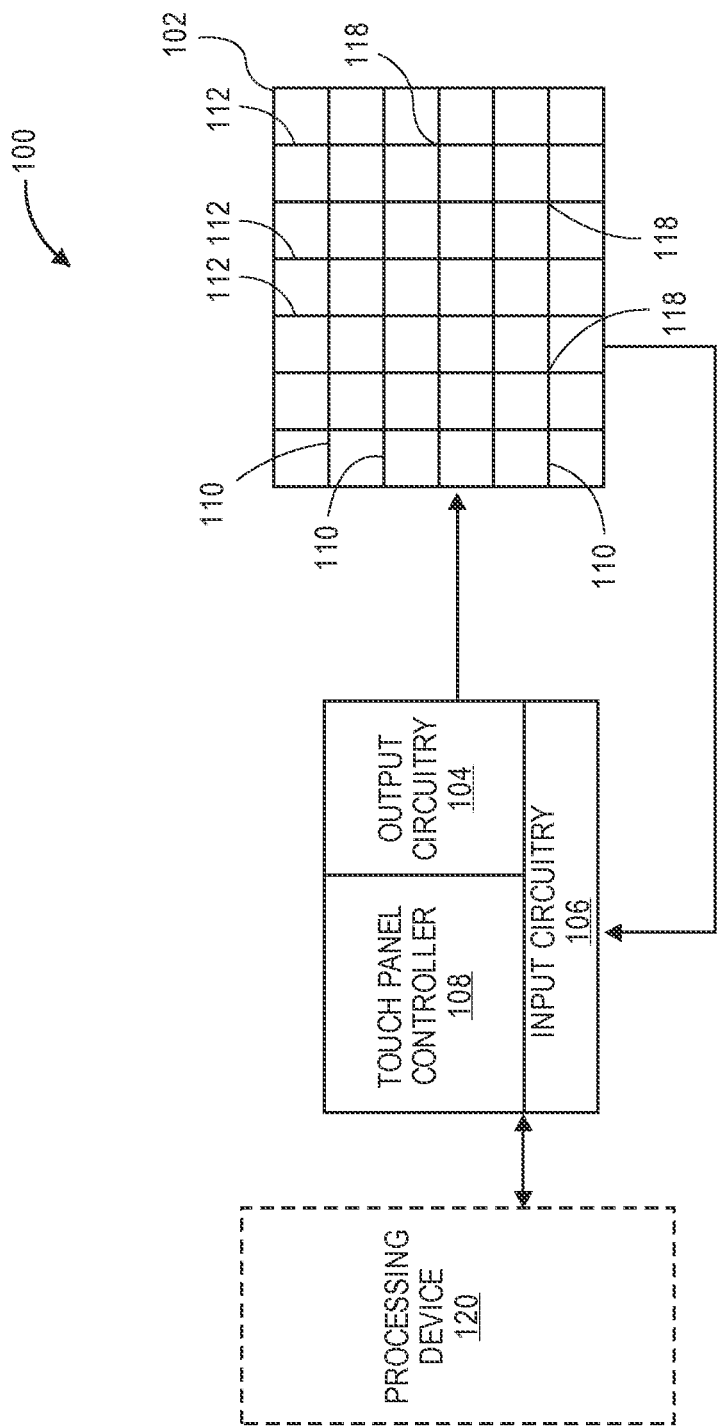
FIG. 1 is a block diagram illustrating a touch panel sensor system in accordance with an example implementation of the present disclosure.

Mobile electronic devices, such as smart phones, electronic tablets (e.g., e-readers), or the like, may utilize styli for note taking and free form drawings. In some instances, passive styli may be utilized to assist in performing the previously mentioned actions. However, passive styli do not include active circuitry to enhance or transmit its positional data. Hence, a mobile electronic device employing a capacitive touch panel may have difficulty determining a position of a passive stylus over the touch panel sensor. Objects that are larger and/or having a greater capacitance to earth/circuit ground with respect to the passive stylus (e.g., palms, fingers, etc.) may create a strong change in capacitance with respect to the change in capacitance due to the passive stylus, which may provide additional difficulty in determining a position or a directional movement of the passive stylus over the touch panel sensor. Additionally, the larger objects may create a more substantial path to earth ground, which increases the interference detected by the sense lines due to a substantial increase in coupling from the common mode sources through the display/touch surface and through the object. For example, the large interference detected by the sense lines may be as large as the signal detected that represents the stylus (or styli).

Accordingly, an apparatus configured to determine an approximate position of an object utilizing mutual-capacitance sensing capabilities during a first mode of operation and determining one or more attributes of the object utilizing self-capacitance sensing capabilities during a second mode of operation is disclosed. In one or more implementations, the apparatus includes a touch panel controller configured to operatively couple to a touch panel sensor. The touch panel sensor includes a plurality of drive electrodes and at least one sense electrode. A plurality of nodes are formed at the intersections of the plurality of drive electrodes and the at least one sense electrode. The touch panel controller includes output circuitry operatively coupled to the plurality of drive electrodes. The output circuitry is configured to generate drive signals to drive the touch panel sensor. The touch panel controller also includes input circuitry operatively coupled to the at least one sense electrode. The input circuitry is configured to measure mutual-capacitance formed at each intersection of the plurality of drive electrodes and of the at least one sense electrode during a first mode of operation and to measure self-capacitance of the at least one sense electrode (or drive electrode) during a second mode of operation. For example, the drive electrodes may be re-configured as sense electrodes during self-capacitance sensing. The touch panel controller is configured to determine an approximate position (and one or more attributes) of an object performing a touch event over the touch panel sensor during the first mode of operation and to determine one or more attributes of the object during the second mode of operation. Thus, the touch panel controller is configured to determine an approximate position and one or more attributes of the one or more objects (e.g., a stylus, a finger, etc.) performing a touch event over the touch panel during the first mode of operation and to determine one or more attributes of the one or more objects during the second mode of operation. For example, the touch panel controller is configured to identify an area of non-concern (e.g., presence of a palm, a finger, etc.) utilizing mutual-capacitance scanning techniques measurements and to scan and track a secondary object, such as a stylus, utilizing self-capacitance scanning techniques, which is a faster and lower power scanning technique as compared to mutual capacitive scanning techniques.

Example Implementations

FIG. 1 illustrates a touch panel sensor system 100 in accordance with an example implementation of the present disclosure. The touch panel sensor system 100 includes a touch panel sensor 102, output circuitry 104 (e.g., one or more sensor drivers), input circuitry 106, and a touch panel controller 108. As shown, the touch panel controller 108 is operatively connected (via a communication interface) to a touch panel sensor 102. In one or more implementations, the touch panel sensor 102 is utilized to sense (e.g., detect) a touch event over a surface of a touch panel. For example, the touch panel sensor 102 can include a capacitive sensing medium having a plurality of row traces (e.g., electrodes), or driving lines 110, and a plurality of column traces (e.g., electrodes), or sensing lines 112, for detecting a change in capacitance due to a touch event performed over a surface of the touch panel. Thus, the touch panel sensor is configured to recognize touches and the position and the magnitude of the touches performed over a surface.

In a specific implementation, the touch panel sensor 102 is a transparent panel positioned in front of or within a display device, such as a liquid crystal display, cathode ray tube, plasma displays, or the like. However, in other implementations, the display device and the touch panel sensor may be distinct (i.e., touch panel sensor is not positioned in front of the display device). The row and the column traces can be formed from a transparent conductive material, such as Indium Tin Oxide (ITO) or Antimony Tin Oxide (ATO), although other transparent and non-transparent materials, such as copper or silver, may be used. In some implementations, the row and the column traces can be perpendicular to each other such that the row and column traces define a coordinate system and each coordinate location comprises a capacitor formed at the intersection 118 of the row and column traces, as described in greater detail herein. In other implementations, other non-Cartesian orientations are also possible.

Figure 2:
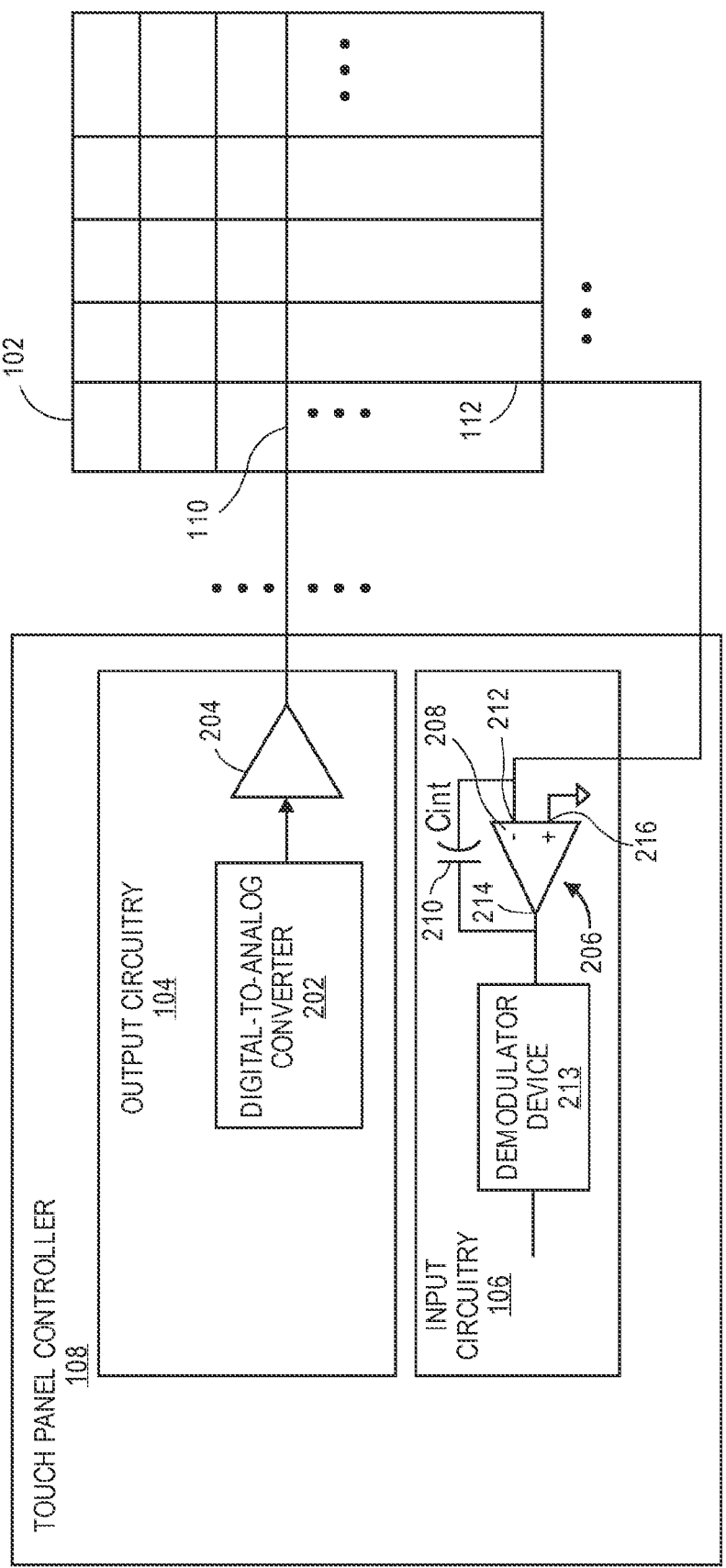
FIG. 2 is a circuit diagram illustrating a touch panel controller in accordance with a specific implementation of the present disclosure.

The touch panel controller 108 is configured to interface with the touch panel sensor 102 to stimulate the sensor 102 (e.g., stimulate the driving lines) and to detect (e.g., read) the change in capacitance from the sensing lines. In one or more implementations, the touch panel controller 108 comprises firmware and/or application specific integrated circuitry (ASIC) that is configured to drive the driving lines 110 (e.g., drive channels). In an implementation, the controller 108 may comprise firmware and/or ASIC that provides processing functionality to the system 100. In other implementations, a processing device (i.e., a processor) 120 may be communicatively coupled to the controller 108 to provide processing functionality to the system 100. For example, the processing device 120 may be configured to provide operating instructions to the touch panel controller 108, as well as receive signals representing capacitive values from the controller 108 and determine (e.g., identify, etc.) one or more positions of an object performing a touch event over the sensor 102. As shown in FIG. 1, the touch panel controller 108 includes circuitry 104 (e.g., output circuitry) configured to output drive signals (e.g., a sensor driver) having waveform characteristics that drive the driving lines. In a specific implementation, as shown in FIG. 2, the sensor driver may be a digital to analog converter 202 (DAC), which is electrically connected to a buffer 204. The buffer 204 is electrically connected to a respective driving line 110. However, in some implementation, the sensor driver may comprise other suitable devices capable of producing driving signals. The controller 108 also includes sensing circuitry (e.g., sensing channels) 106 (e.g., input circuitry) for measuring (e.g., detecting) a change in capacitance due to a touch event performed over the touch panel sensor 108.

Each intersection 118 of the driving lines 110 (e.g., rows) and the sensing lines 112 (e.g., columns) represents a pixel that has a characteristic mutual-capacitance. A grounded object (e.g., a finger, a stylus, etc.) that moves towards a corresponding pixel 118 may shunt an electric field present between the corresponding row and column intersection, which causes a decrease in the mutual-capacitance at that location. During operation, each row (or column) may be sequentially charged by driving (via the sensor drivers) the corresponding drive line 110 with a predetermined voltage signal having a waveform corresponding to a particular frequency characteristic. The capacitance of each intersection 118 is measured. That is, the sensing circuitry 106 is configured to measure capacitive coupling of the drive signals between the drive lines 110 and the sensing lines 112 to determine the capacitance of an object with respect to each node (e.g., an intersection 118 pixel).

The controller 108 is configured to generate the drive signals (e.g., via the circuitry 104) necessary to scan (e.g., measure or determine the change in capacitance within) the touch panel sensor 102. For example, the controller 108 is configured to cause the output circuitry 104 to output signals having a predefined frequency characteristic (e.g., generate an output signal occurring within a predefined range of frequencies). The sensing circuitry 106 is configured to monitor (e.g., determine) the charge transferred in a given time to detect changes in capacitance at each node. The positions within the touch panel sensor 102 where the capacitance changes occur and the magnitude of those changes are used to identify and to quantify the touch events performed over the sensor 102. Thus, driving the drive lines 110 and sensing the charge transfer as a result of the touch event is a function of the controller 108. In some implementations, the sensing circuitry 106 may comprise a plurality of integrator devices 206. As shown, each integrator device 206 is coupled to a corresponding sensing line. As shown, the integrator devices 206 comprise a charge amplifier 208 having an integrating capacitor ($C_{int}$) 210 electrically connected between an inverting terminal 212 and an output terminal 214 of the charge amplifier 208. The charge amplifier 208 also includes a non-inverting terminal 216. The charge amplifier 208 is configured to transfer the input charge (e.g., charge from the sensing lines 112) to the integrating capacitor 210 and to generate an output voltage at the output 214 at least approximately equal to the voltage across the capacitor 210. Thus, the output voltage is proportional to the charge at the integrating capacitor 210 and, respectively, to the input charge. However, in another implementation, the sensing circuitry 116 may comprise any device (e.g., circuitry) capable of receiving a capacitance and outputting a voltage that corresponds to the capacitance. The output 214 of the charge amplifier 208 is electrically connected to a demodulator device 213. In one or more implementations, the demodulator device 213 comprises an analog-to-digital converter (ADC).

As described above, FIG. 2 illustrates a specific implementation of the touch panel sensor system 100 shown in FIG. 1. In FIG. 2, the circuitry 104 (e.g., output circuitry) comprises a sensor DAC 202 coupled to a buffer 204. The buffer 204 is configured to buffer the signal generated by the sensor DAC 202 and outputs the buffered drive signal to the sensor 102 (e.g., drive the driving lines 110 of the sensor 102). In implementations, the sensor DAC 202 may generate a signal having waveform characteristics represented by the equation:

$$A_1 \cdot \sin(\omega t), \quad \text{EQN. 1,}$$

where $A_1$ represents the amplitude of the signal, $\omega$ represents the angular frequency of the signal, and t represents time. However, in other implementations, the sensor DAC 202 may be configured to output other signals having other waveform characteristics, such as signals having square waveform characteristics, and so forth.

In one or more implementations, the system 100 is configured to measure a change in mutual-capacitance ($C_M$) within the sensor 102 and a change in self-capacitance ($C_S$) within the sensor 102. The mutual-capacitance ($C_M$) is capacitance that occurs between two charge-holding objects (e.g., conductors). In this instance, the mutual-capacitance is the capacitance between the driving lines 110 and the sensing lines 112 that comprise the sensor 102. The self-capacitance is the capacitance associated with the respective column sensing line ($C_{SS}$) and/or the respective driving line 110 ($C_{SD}$), which represents the amount of electrical charge to be furnished to the respective driving line 110 or sensing line 112 to raise its electrical potential by one unit (e.g., one volt, etc.). During a self-capacitance measuring mode of operation, the output circuitry 104 may be configured to electrically ground the driving lines 110 to allow the input circuitry 106 to determine a change in self-capacitance within the touch panel 102.

The touch panel controller 108 is configured to cause the input circuitry 106 to measure changes in mutual-capacitance within the sensor 102 during a mode of operation to determine an approximate position of an object over the sensor 102 and to measure changes in self-capacitance within the sensor 102 during a second mode of operation to determine (measure) one or more attributes of the object. In one or more implementations, the controller 108 is configured to cause the input circuitry 106 to scan each sensing line 112 in sequential order to determine a change in mutual-capacitance with respect to the corresponding sensing line 112 during the first mode of operation to determine an approximate position of the object, as described in greater detail herein.

In an implementation, the controller 108 is configured to cause the input circuitry 106 to scan at least a portion of the sensing lines 112 in parallel to determine a change in self-capacitance at the scanned sensing lines 112 (or drive lines 110) during a second mode of operation to determine the attributes of the object (e.g., position of the object, directional movement of the object, magnitude (size) of the object, etc.). In another implementation, the controller 108 is configured to cause the input circuitry to scan at least a portion of the sensing lines 112 (or drive lines 110) in an interleaved protocol to determine a change in self-capacitance during a second mode of operation to determine one or more attributes of the object.

Figure 3:
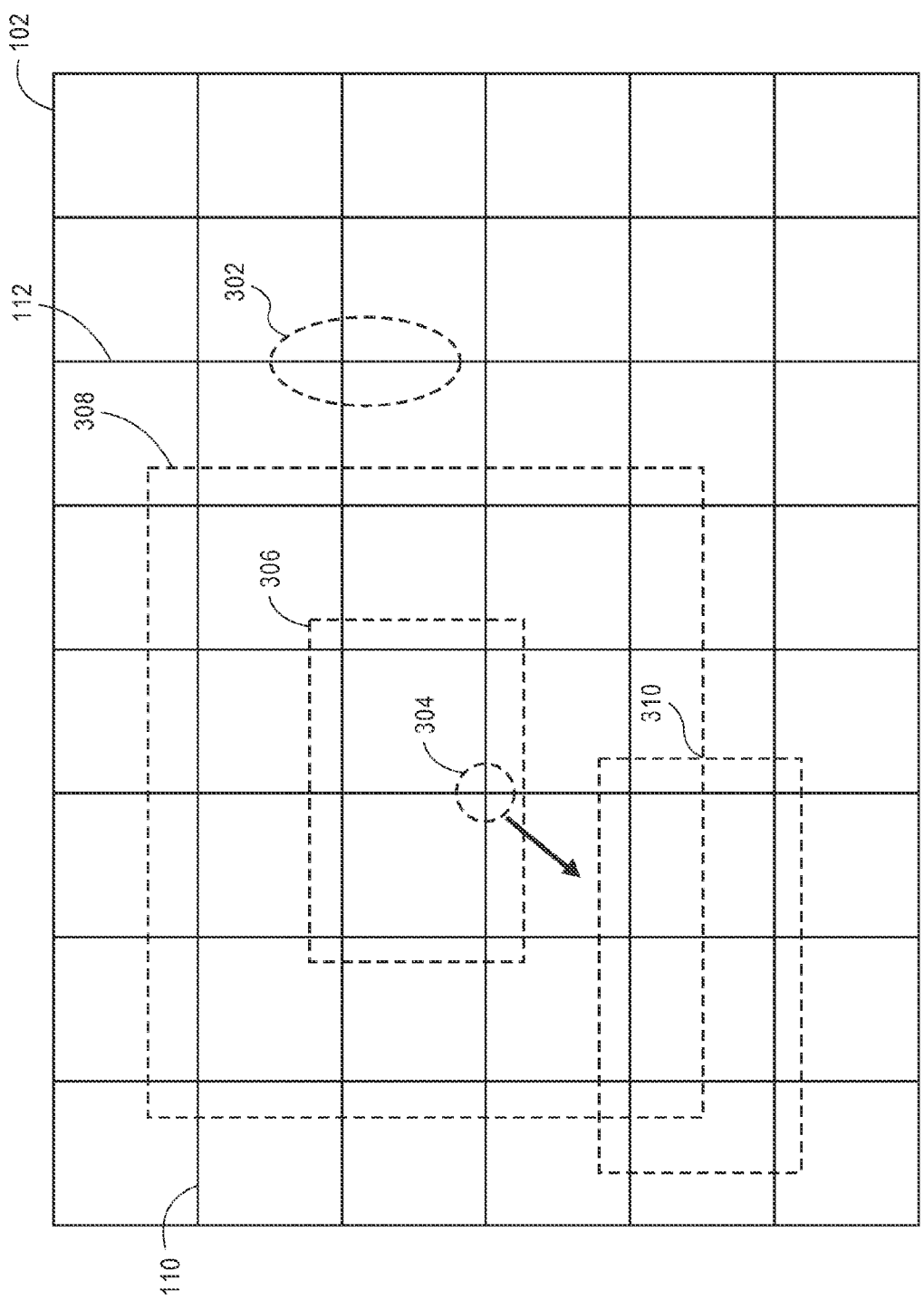
FIG. 3 is a diagrammatic circuit diagram illustrating magnitudes of multiple objects performing a touch event over a touch screen employing a touch panel sensor in accordance with an example implementation of the present disclosure.

For example, a user may utilize a stylus, such as a passive stylus (i.e., stylus having no active circuitry) to perform a touch event over the touch panel sensor 102. As described above, the controller 108 is configured to cause the input circuitry 106 to measure changes in mutual-capacitance for a first time period. The controller 108 and/or a processing device 120 in communication with the controller 108 is configured to identify (determine) a location of a passive stylus performing a touch event over the sensor 102. The controller 108 and/or the processing device 120 is configured to distinguish a position of an object with respect to other potential objects (e.g., fingers, palms, other hovering objects, etc.) based upon the size and signal characteristics of each object in contact (or near-contact) with the sensor 102. For example, fingers, palms, and so forth, may cause a change in mutual-capacitance greater in value with respect to a passive stylus. Additionally, the passive stylus may generate a small, cone shaped sharp edged signal representing a change in mutual-capacitance. For instance, the signal amplitude of a signal representing a finger is at least approximately ten times larger as compared to a signal amplitude of a signal representing a stylus. Additionally, the surface area of the signal representing the finger is at least approximately five to thirty millimeters as compared to the surface area of the signal representing the stylus, which is at least approximately one to two millimeters. Thus, the level of the signal (and interference coupling to circuit ground) is orders of magnitude different if the energy is integrated in these two regions. Thus, the controller 108 and/or the processing device 120 is configured to determine the position of a passive stylus including, but not necessarily limited to: a value representing the change in mutual-capacitance, a characteristic of the signal representing the change in capacitance, or the like. For example, the controller 108 and/or the processing device 120 is configured to determine (e.g., identify) an approximate position, as well as a first set of one or more attributes (e.g., a position based upon the mutual-capacitance measurement, a movement based upon the mutual-capacitance measurement, a breadth characteristic based upon the mutual-capacitance measurement, a size characteristic based upon the mutual-capacitance measurement), of an object (e.g., a stylus) based upon measuring value that represents the change in mutual-capacitance within the touch panel sensor 102 (e.g., the value representing the change in mutual-capacitance is within a predefined threshold of acceptable values indicating a passive stylus is over the touch sensor 102). For instance, the controller 108 and/or the processing device 120 may identify one or more pixels 118 (e.g., identify a subset of pixels 118) that correspond to the change in mutual-capacitance. In another instance, the controller 108 and/or the processing device 120 may identify one or more channels (e.g., drive lines 110, sensing lines 112) that correspond to the change in mutual-capacitance. FIG. 3 is an example illustration of a various representations of multiple objects positioned over the touch panel sensor 102. Oval region 302 represents a size (magnitude) of a finger positioned over the sensor 102, and the circular region 304 represents a size (magnitude) of a passive stylus positioned over the sensor 102. Due to the relative size of the finger with respect to the passive stylus, the change in mutual-capacitance due to the finger is larger with respect to the change in mutual-capacitance due to the passive stylus.

Upon identifying a subset of pixels 118 or channels (drive lines 110 and sensing lines 112), the controller 108 is configured to transition the system 100 to scan (e.g., measure, determine) changes in self-capacitance about the identified subset of channels or pixels 118. For example, the driver lines 110 may be connected to electrical ground or virtual ground, and the input circuitry 106 is configured to measure a change in self-capacitance within the subset of channels identified as having a change in mutual-capacitance indicating a passive stylus positioned over the touch panel sensor 102 (i.e., an identified subset of channels is denoted as region 306 in FIG. 3). As described above, the controller 108 may be configured to cause scanning (measuring) of the change in self-capacitance in parallel or in an interleaved fashion (e.g., measure the sensing lines 112 in parallel). Thus, the controller 108 may be configured to measure sensing lines 112 corresponding to the subset of channels in parallel (or in an interleaved fashion). In other words, the self-capacitance measurement may allow for a more deliberate process for identifying a second set of one or more attributes (e.g., a position based upon the self-capacitance measurement, a movement based upon the self-capacitance measurement, a breadth characteristic based upon the self-capacitance measurement, a size characteristic based upon the self-capacitance measurement) of the stylus over the sensor 102. For example, measuring changes in self-capacitance in parallel (as compared to the sequential nature of mutual-capacitance measurements) may allow for more accurate identification of the position, movement, and size of the passive stylus over the sensor 102. Thus, the controller 108 and/or the processing device 120 is configured to identify the location, movement, breadth, and size of the passive stylus (based upon the measured values representing changes in self-capacitance due to the stylus being positioned over the sensor 102 within the subset of channels).

The controller 108 is configured to continue in self-capacitance measuring mode while one or more attributes (e.g., position, movement, size, breadth etc.) of the object is tracked. In some implementations, the controller 108 is configured to expand the subset channels to account for stylus movement outside the subset of channels (e.g., the controller 108 measures changes in self-capacitance outside the identified subset of channels). In this implementation, the controller 108 may measure a change in capacitance within a superset of channels (denoted as region 308 in FIG. 3) or identify another subset of channels (denoted as region 310 in FIG. 3) within sensor 102 based upon the positioning and movement of the stylus.

The use of first mode of operation and the second mode of operation are utilized for convenience purposes only. Thus, it is understood that a self-capacitance scan may precede a mutual-capacitance scan, as well as follow the mutual-capacitance scan in accordance with implementations of the present disclosure.

Example Methods

Figure 4:
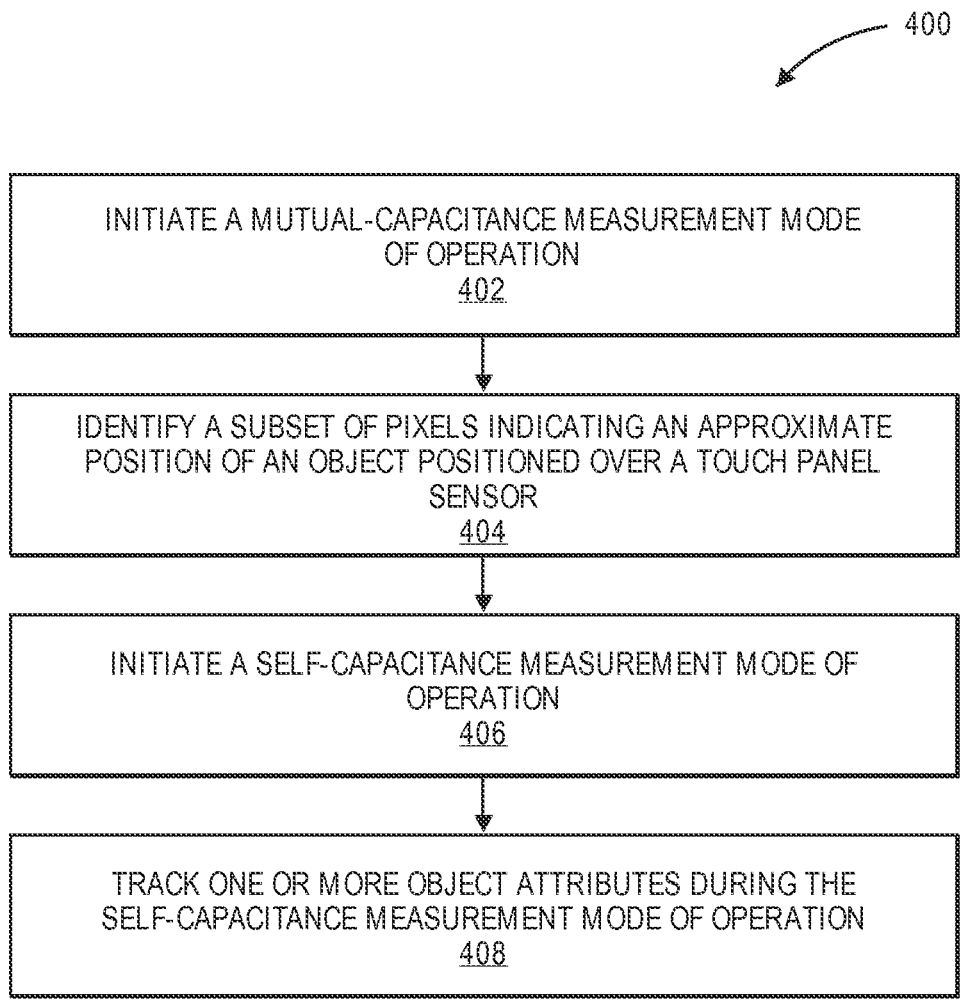
FIG. 4 is a flow diagram illustrating an example method for determining (e.g., identifying, measuring) a position of object performing a touch event over a touch panel sensor in accordance with an example implementation of the present disclosure.

FIG. 4 illustrates a method 300 for identifying a position and/or a movement of a passive stylus utilizing a mutual-capacitance measurement mode of operation and self-capacitance measurement mode of operation within a touch panel sensor system according to an example implementation of the present disclosure. A mutual-capacitance measurement mode of operation is initiated (Block 402). In an implementation, the touch panel controller 108 is configured to cause the output circuitry 104 to generate one or more drive signals having a frequency characteristic to drive the driving lines 110. The drive signals drive the driving lines 110, which allows the input circuitry 106 to sense (e.g., determine a change in) mutual-capacitance within the touch panel sensor 102. An identification of a subset of pixels indicating an approximate position of an object positioned over a touch panel sensor is made (Block 404). As described above, the touch panel controller 108 and/or the processing device 120 is configured to identify (determine) a subset of pixels 118 or channels indicating a position of an object, such as a passive stylus, based upon a change in mutual-capacitance attributed to the object positioned over the touch panel sensor 102. For example, the controller 108 and/or the processing device 120 is configured to identify a subset of pixels 118 or channels indicating the position of a passive stylus based upon, but not limited to: a value representing a change in mutual-capacitance, a physical characteristic of a signal representing a change in mutual-capacitance, or the like.

Once a subset of pixels within the touch panel sensor have been identified, a self-capacitance measurement mode of operation is initiated (Block 406). Once the position of the object has been identified, the touch panel controller 108 initiates a self-capacitance mode of operation to identify one or more attributes of the object within the subset of channels (e.g., drive lines 110, sensing lines 112) due to the change in self-capacitance attributed to the object positioned over the touch panel sensor 102. For example, the input circuitry 106 is configured to measure a change in self-capacitance within the subset of channels to identify and track attributes of the object. One or more attributes of the object are identified and/or tracked during the self-capacitance measurement mode of operation (Block 408). Based upon the self-capacitance measurements, the touch panel controller 108 and/or the processing device 120 is configured to identify positional attributes, movement attributes, breadth attributes (e.g., determining a width difference between the object of interest and another object of interest) and magnitude attributes (e.g., size of the object indicated by the change of self-capacitance at one or more channels) of the object of interest (e.g., the passive stylus). For example, the controller 108 and/or the processing device 120 is configured to identify a channel (or channels) that correspond to the location of the object positioned over the sensor 102. The controller 108 and/or the processing device 120 is configured to track the attributes of the object based upon measured changes in self capacitances indicating movement of the object over the sensor 102.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:

a touch panel controller configured to operatively couple to a touch panel sensor, the touch panel sensor including a plurality of drive electrodes and at least one sense electrode, a plurality of nodes formed at intersections of the plurality of drive electrodes and the at least one sense electrode, the touch panel controller comprising:

output circuitry operatively coupled to the plurality of drive electrodes, the output circuitry configured to generate drive signals to drive the touch panel sensor; and input circuitry operatively coupled to the at least one sense electrode, the input circuitry configured to measure mutual-capacitance formed at each intersection of the plurality of drive electrodes and of the at least one sense electrode during a first mode of operation and to measure self-capacitance of the plurality of drive electrodes or of the at least one sense electrode during a second mode of operation, the touch panel controller configured to determine an approximate position and a first set of one or more attributes of an object performing a touch event over the touch panel sensor during the first mode of operation, to initiate the second mode of operation after the approximate position is determined and to determine a second set of one or more attributes of the object during the second mode of operation.

2. The apparatus as recited in claim 1, wherein the object is a stylus.

3. The apparatus as recited in claim 1, wherein the touch panel controller is configured to identify a subset of nodes of the plurality of nodes indicating an approximate position of the object during the first mode of operation.

4. The apparatus as recited in claim 1, wherein the touch panel controller is configured to determine at least one of a value representing a change in mutual-capacitance or a physical characteristic of a signal representing a change in mutual-capacitance during the first mode of operation.

5. The apparatus as recited in claim 1, wherein the one or more attributes include a position of the object over the touch panel sensor, a directional movement of the object over the touch panel sensor, a breadth characteristic of the object, or a magnitude of the object.

6. The apparatus as recited in claim 1, wherein the output circuitry comprises a digital-to-analog converter coupled to a buffer, the buffer coupled to at least one drive electrode of the plurality of drive electrodes.

7. The apparatus as recited in claim 1, wherein the input circuitry comprises a charge amplifier, the charge amplifier further comprising an operational amplifier having an inverting input terminal, a non-inverting input terminal, and an output terminal, the inverting input terminal coupled to at least one sense electrode; and an integrating capacitor electrically coupled between the inverting input terminal and the output terminal.

8. An apparatus comprising:

a touch panel controller configured to operatively couple to a touch panel sensor, the touch panel sensor including a plurality of drive electrodes and at least one sense electrode, a plurality of nodes formed at intersections of the plurality of drive electrodes and the at least one sense electrode, the touch panel controller comprising:

output circuitry operatively coupled to the plurality of drive electrodes, the output circuitry configured to generate drive signals to drive the touch panel sensor; and input circuitry operatively coupled to the at least one sense electrode, the input circuitry configured to measure mutual-capacitance formed at each intersection of the plurality of drive electrodes and of the at least one sense electrode during a first mode of operation and to measure self-capacitance of the plurality of drive electrodes or of the at least one sense electrode during a second mode of operation, the touch panel controller configured to determine an approximate position and a first set of one or more attributes of an object performing a touch event over the touch panel sensor during the first mode of operation, to initiate the second mode of operation after the approximate position is determined and to determine a second set of one or more attributes of the object during the second mode of operation, the controller configured to identify a subset of nodes of the plurality of nodes indicating the approximate position of the object during the first mode of operation.

9. The apparatus as recited in claim 8, wherein the object is a stylus.

10. The apparatus as recited in claim 8, wherein the touch panel controller is configured to determine at least one of a value representing a change in mutual-capacitance or a physical characteristic of a signal representing a change in mutual-capacitance during the first mode of operation.

11. The apparatus as recited in claim 8, wherein the one or more attributes include a position of the object over the touch panel sensor, a directional movement of the object over the touch panel sensor, a breadth characteristic of the object, or a magnitude of the object.

12. The apparatus as recited in claim 8, wherein the output circuitry comprises a digital-to-analog converter coupled to a buffer, the buffer coupled to at least one drive electrode of the plurality of drive electrodes.

13. The apparatus as recited in claim 8, wherein the input circuitry comprises a charge amplifier, the charge amplifier further comprising an operational amplifier having an inverting input terminal, a non-inverting input terminal, and an output terminal, the inverting input terminal coupled to at least one sense electrode; and an integrating capacitor electrically coupled between the inverting input terminal and the output terminal.

14. The apparatus as recited in claim 8, wherein the object is a finger.

15. A method comprising:

initiating a mutual-capacitance measurement mode of operation;

identifying a subset of pixels associated with a touch panel sensor indicating an approximate position of an object positioned over the touch panel sensor during the mutual-capacitance measurement mode of operation;

initiating a self-capacitance measurement mode of operation; and tracking one or more attributes of the object during the self-capacitance measurement mode of operation.

16. The method as recited in claim 15, wherein initiating the mutual-capacitance measurement mode of operation comprises causing output circuitry to generate one or more drive signals to drive at least one drive line.

17. The method as recited in claim 15, wherein identifying a subset of pixels associated with a touch panel sensor indicating an approximate position comprises identifying a position of the object based upon a change in mutual-capacitance attributed to the object positioned over the touch panel sensor.

18. The method as recited in claim 15, wherein initiating the self-capacitance measurement mode of operation further comprises initiating the self-capacitance measurement mode of operation to measure a change in self-capacitance within a subset of channels for tracking object attributes of the object.

19. The method as recited in claim 15, tracking one or more object attributes during the self-capacitance measurement mode of operation comprises tracking the attributes of the object based upon measured changes in self-capacitances within the touch panel sensor indicating movement of the object over the touch panel sensor.

20. The method as recited in claim 19, wherein the one or more attributes of the object comprise at least one of positional attributes, movement attributes, breadth attributes, or magnitude attributes of the object.

* * * * *